United States Patent [19]

Garcia

[11] 4,059,913

[45] Nov. 29, 1977

[54] SLIDE DISPLAY

[76] Inventor: Federico Garcia, 12865 SW. 54th St., Miami, Fla. 33175

[21] Appl. No.: 707,310

[22] Filed: July 21, 1976

[51] Int. Cl.² .............................................. G02B 7/02
[52] U.S. Cl. .................................... 40/64 A; 350/140
[58] Field of Search ................. 40/64 A, 63 A, 86 A, 40/106.1, 124.1; 350/140; 206/45.13; 229/92.1

[56] References Cited

U.S. PATENT DOCUMENTS

| | | | |
|---|---|---|---|
| 2,553,160 | 5/1951 | Arps | 40/63 A X |
| 2,809,452 | 10/1957 | Brown | 40/63 A |
| 2,986,830 | 6/1961 | Underberg et al. | 350/140 X |
| 3,557,476 | 1/1971 | Kalb | 40/86 A |
| 3,756,699 | 9/1973 | Martin | 350/140 X |

Primary Examiner—John F. Pitrelli

[57] ABSTRACT

A foldable slide display of folded paperboard material which includes a folded back panel and a viewing box hingedly connected to the back panel for folding movement between an upright condition and a folded collapsed condition and wherein the viewing box includes a pattern of viewing openings in aligned relation and in registry with window openings suitable for displaying film so that when the device is folded into an open condition, the film may be observed through the viewing openings of the box and the box may include a slide with a magnifying glass for sliding movement therealong for enlarging the image seen on the film.

6 Claims, 5 Drawing Figures

SLIDE DISPLAY

FIELD OF THE INVENTION

This invention relates to a slide display and, more particularly, to a slide display which is useful, for example, in advertising.

BACKGROUND OF THE INVENTION

In the past there have been numerous types of display devices for advertising materials. One of the most desirable forms of advertising are slides or pieces of film which may be viewed against a light background. This invention is of a device which includes a viewing box and means for mounting film clips so that the clips can be viewed when the device is in an open condition and which includes a viewing box which is adapted to be collapsed into a folded condition for mailing.

It is, generally, an object of this invention to provide an improved slide display which is suitable for advertising in accordance with the description which is set forth more fully hereinafter.

DESCRIPTION OF THE PREFERRED EMBODIMENT

Figure 3:
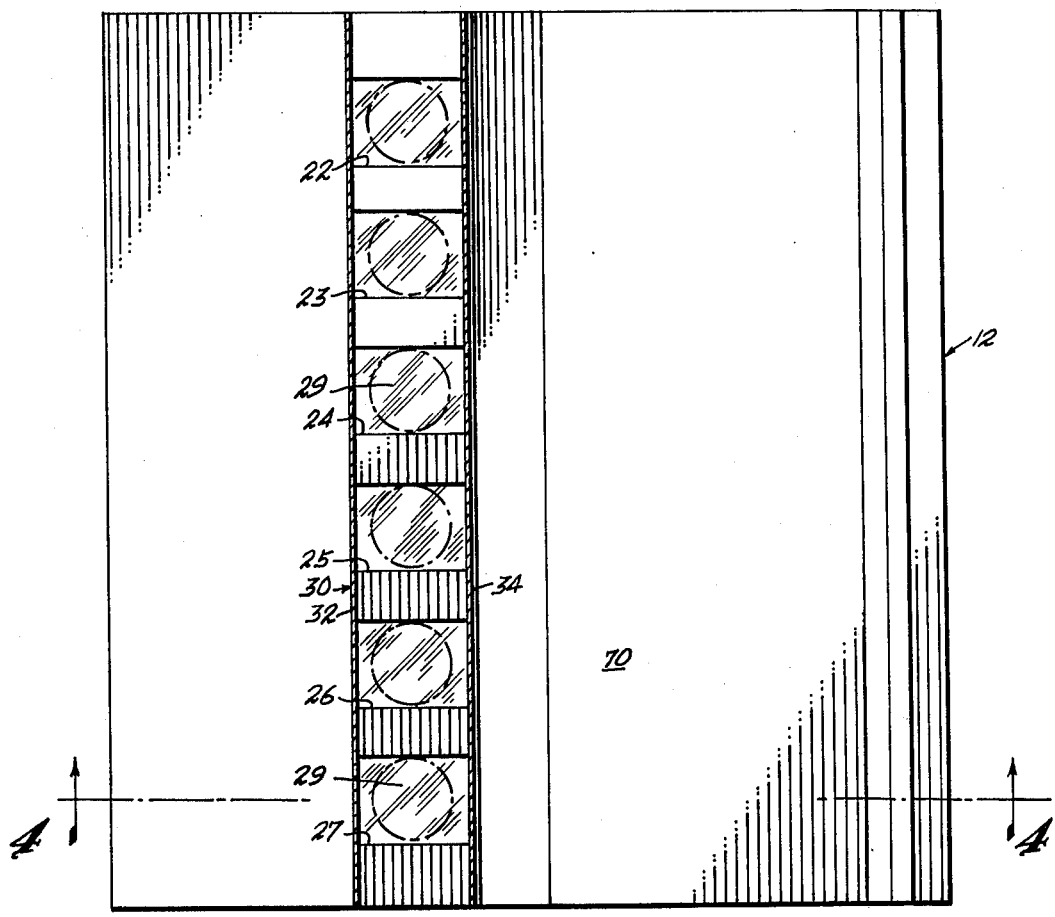
FIG. 3 is a view in cross section taken on the plane indicated by the line 3—3 of FIG. 4 and looking in the direction of the arrows.

Referring to the drawings wherein like reference characters designate like or corresponding parts throughout the several views and referring particularly to FIG. 3, it is seen that there is provided a back panel of cardboard or foldable paperboard generally designated by the numeral 12 which includes a fold line 14 thereacross in the central zone. The fold line defines, on opposite sides thereof, a first portion 16 and a second portion 18. There is a strip zone in the first portion which extends parallel to the fold line 14 completely across the first portion 16 and in which there are a plurality of aligned spaced windows, 22, 23, 24, 25, 26 and 27. A retainer means 28 in the form of an elongate strip with adhesive longitudinally extending edges is provided to hold a film 29 in each of the windows. The film 29 may comprise a strip of different scenes, such as are utilized in advertising and may display a product. The retaining means 28 is preferably of translucent material.

Figure 1:
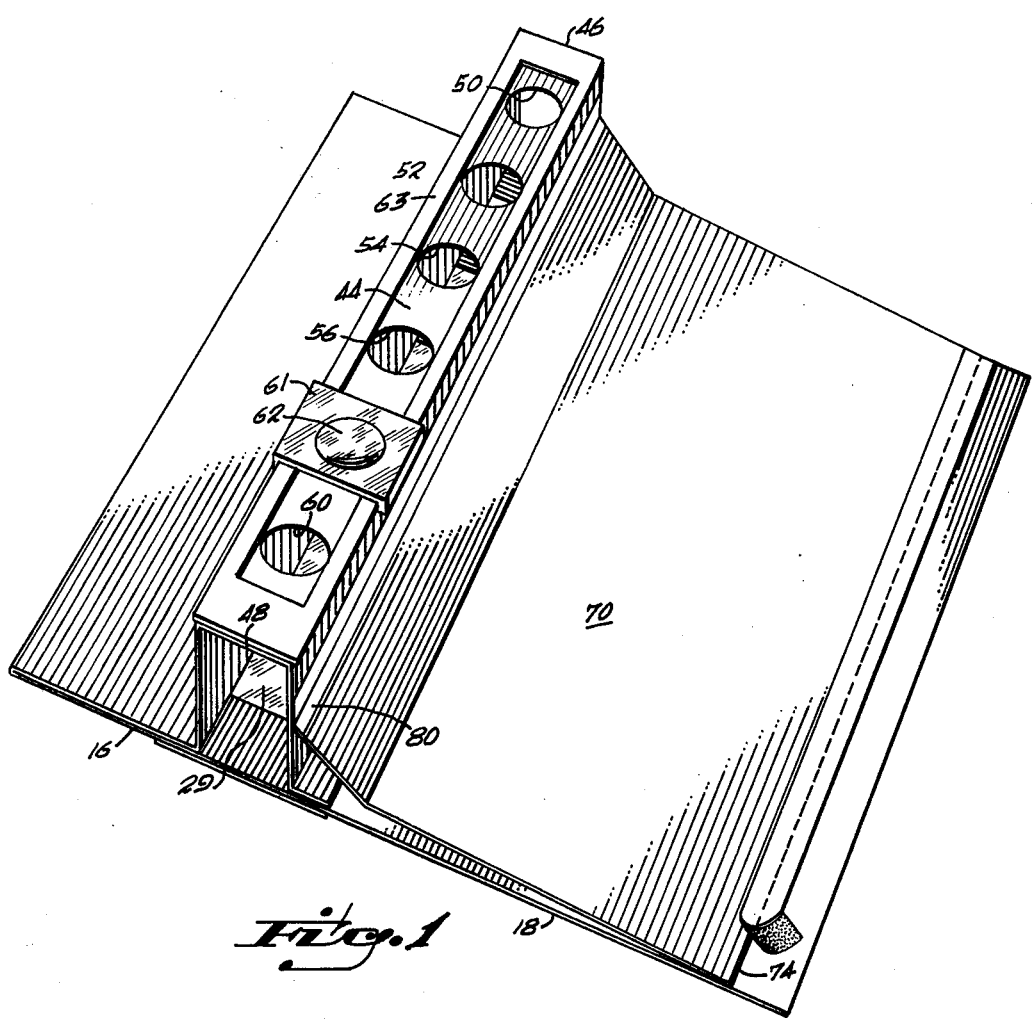
FIG. 1 is a perspective view of the slide display.
Figure 2:
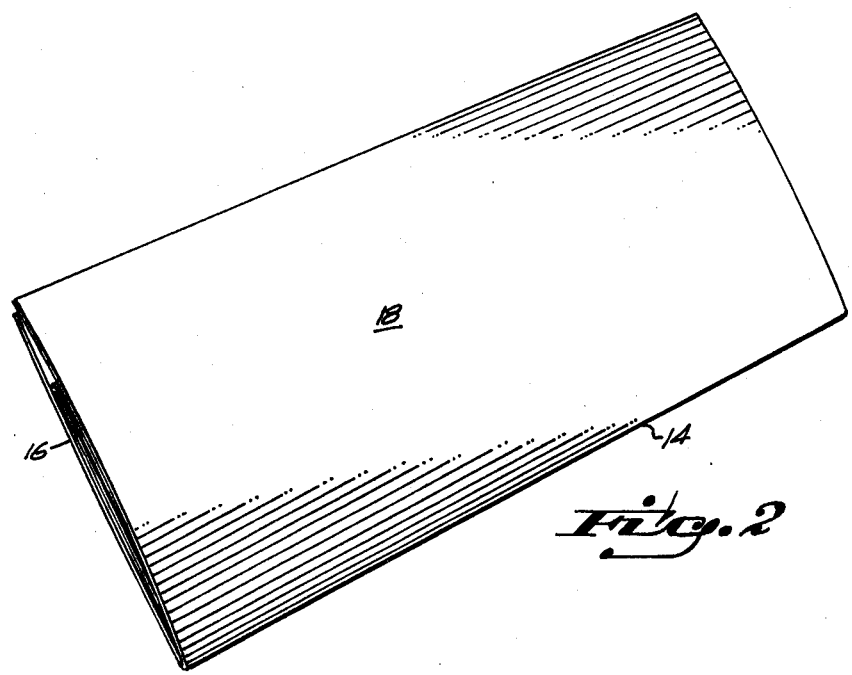
FIG. 2 is a view similar to FIG. 1 and illustrating the slide display in a folded attitude.
Figure 4:
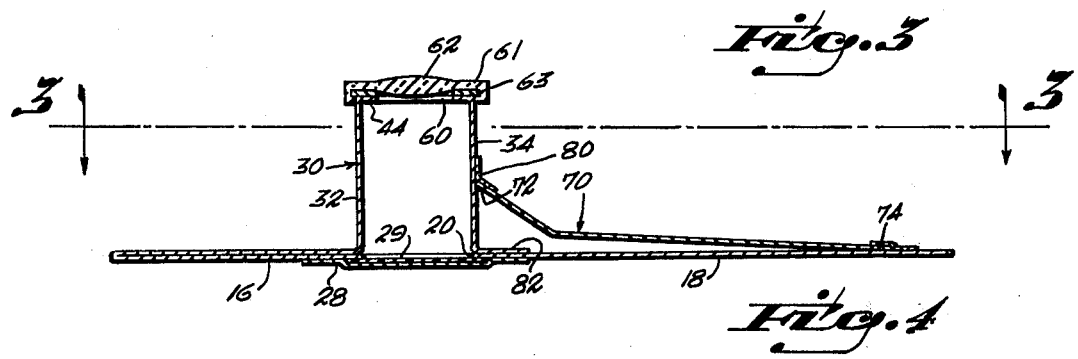
FIG. 4 is a view in cross section taken on the plane indicated by the line 4—4 of FIG. 3 and looking in the direction of the arrows.
Figure 5:
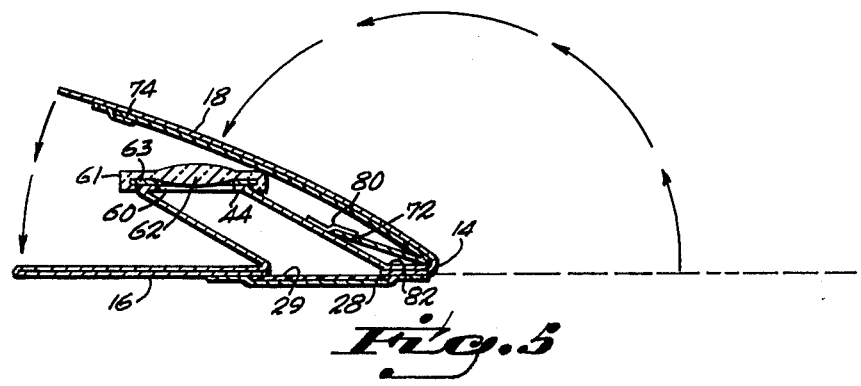
FIG. 5 is a view illustrating folding of the slide display from the attitude shown in FIG. 1 to the attitude shown in FIG. 2.

A viewing box 30 is provided which includes a first and a second side wall 32 and 34 in upstanding relation with respect to the first portion 16 and on opposite sides of the strip zone thereacross. Each of the side walls has an upper edge and a lower edge. The upper edges are spanned by a roof 44 having a first end 46 and a second end 48. The roof is provided with a plurality of viewing openings 50, 52, 54, 56 and 60, each of which are in registry with one of the windows of the strip zone in the first portion 16. Means are provided to connect the lower edges of the side walls of the back panel along the strip edges, in a hinge-type connection as will be explained more fully hereinafter. A slide 61 which includes a magnifying means in the form of a glass 62 is slidably mounted on the box which includes a guide track 63 connecting into channels which are inturned and provided on the lower portion of the slide, see FIG. 4. Stop means in the form of downturned ends of the upper sheet or means 63 may be provided to limit travel of the slide to movement between the first and second ends of the roof. With reference to FIG. 4, means are provided for hingedly collapsing and moving the box into an upright position for viewing. To this end, a pull member 70 which comprises a panel zone having a first end 72 and a second end 74 is provided with the pull member being connected to the first side wall 34 of the box, that is the side wall which is adjacent the fold line 14 and with the second end being connected to the second portion of the back panel and, indeed, it may be integral with it or it may be taped as at 74 to it. Hinge means 80 are provided in the form of an adhesive strip at the connection of the pull member in the first side wall. Hinge means are also provided as at 82 in the form of the lower terminal edge of the side wall of the box there indicated being outturned and adhesively secured to the first portion 16 of the panel 12. The length of the pull member and the distance between the first side wall 34 of the box at the connection of the pull member and the first side wall and the second portion of the back panel being of a ratio such that the angle opposite the length of the pull member is about 90 degrees when in the position shown in FIG. 4; that is, the box is erected for viewing. When the back panel is folded as indicated in FIG. 5, the viewing box will collapse to the position shown in FIG. 2 with the various portions of the slide display being generally in what may be described as roughly parallel planes, see FIG. 2.

In operation, an advertiser or anyone having items to be displayed in a card may insert the film strip and conveniently ship it, with a message being written on the card so that the receiver has advertising or a message and an opportunity to view what is referred to in the written text by simply moving the slide from viewing opening to viewing opening to see what is depicted on the film.

What is claimed is:

1. A back panel having a fold line thereacross in the central zone defining a first portion and a second portion on opposite sides respectively of the fold line and including, a strip zone included in the first portion parallel to the fold line with one edge of the strip zone being closely adjacent the fold line, the strip having a plurality of aligned spaced windows therealong and a retainer means to hold a piece of film in each of the windows, a viewing box comprising a first and a second side wall in spaced parallel relation with an upper edge and a lower edge and comprising a roof having a first end and a second end spanning the upper edges of the side walls, said roof having a plurality of viewing openings in registry with the windows of the strip zone, means connecting the lower edges of the side walls to the back panel along the strip edges, a slide on the box and including a magnifying means and guide track means connecting the slide for longitudinal movement across the box between the first and second end of said roof, a pull member having a first end and a second end, the first end of said pull member being connected to the first side wall of said box and said first side wall being adjacent said fold line and the second end being connected to the second portion of said back panel, hinge means at the connection of said pull member and said first side wall and said back panel and hinge means included in said means connecting the lower edges of said side wall to said second portion of the back panel, the length of the pull member and the distance between (a) the first side wall of the box at the connection of the pull member and the said first side wall and (b) the second portion of the back panel being a ratio such that the angle opposite the length of the pull member is about 90°.

whereby the box is adapted to collapse when the back panel is folded along the fold line and the box is adapted to be erected with the first and second side wall in perpendicular relation to the first portion of the back panel when the portions of the back panel are in a parallel plane.

2. The device as set forth in claim 1 wherein said retainer means comprises a strip of translucent material.

3. The device as set forth in claim 1 wherein the pull member is integral with said back panel.

4. The device as set forth in claim 1 wherein means are provided to connect the second end of said pull member to said back panel.

5. The device as set forth in claim 1 wherein stop means are provided to limit travel of the slide between the roof ends.

6. The device as set forth in claim 1 wherein the back panel and box and pull member comprise a single sheet of foldable paperboard.

* * * * *